United States Patent [19]

Schnorrenberg

[11] 4,119,294
[45] Oct. 10, 1978

[54] PRESSURE-REGULATING VALVE

[75] Inventor: Josef Schnorrenberg, Bad Kreuznach, Fed. Rep. of Germany

[73] Assignee: Jos. Schneider & Co. Optische Werke, Bad Kreuznach, Fed. Rep. of Germany

[21] Appl. No.: 726,430

[22] Filed: Sep. 24, 1976

[30] Foreign Application Priority Data

Oct. 2, 1975 [DE] Fed. Rep. of Germany ....... 2544001

[51] Int. Cl.² ............................................. F16K 31/02
[52] U.S. Cl. ..................................... 251/129; 251/282; 251/324; 137/505.18
[58] Field of Search ....................... 137/505.18, 505.27, 137/505.28; 251/129, 324, 282; 91/52

[56] References Cited

U.S. PATENT DOCUMENTS

| 2,270,304 | 1/1942 | Jacobsson | 137/505.41 X |
| 2,920,647 | 1/1960 | Mercier | 137/505.18 |
| 3,023,773 | 3/1962 | Hasbany | 137/505.18 X |
| 3,174,505 | 3/1965 | Bauer | 137/505.18 |
| 3,502,100 | 3/1970 | Jonson | 137/501 X |
| 3,517,681 | 6/1970 | Davison | 137/505.18 |
| 3,522,818 | 8/1970 | Suchy | 137/505.28 X |

Primary Examiner—Harold W. Weakley
Attorney, Agent, or Firm—Karl F. Ross

[57] ABSTRACT

A piston in a valve cylinder has an inlet port connected to a source of high-pressure fluid, opening onto a peripheral recess of its piston between two piston heads of like diameter, and an outlet port leading to a load, this outlet port being adjustably throttled by an edge of one of these piston heads bounding the recess. The piston is electromagnetically displaceable by the core of a solenoid, acting upon one of its ends, against the load pressure prevailing in the outlet port which communicates with an axial bore in the opposite piston end, this bore being closed by an axially slidable plug backstopped by an element fixed to the cylinder.

9 Claims, 2 Drawing Figures

4,119,294

PRESSURE-REGULATING VALVE

FIELD OF THE INVENTION

My present invention relates to a pressure-regulating valve wherein an inlet port in a cylinder housing, connected to a source of substantially constant fluid pressure, communicates with an outlet port in that housing, leading to a load, via a restricted passage controlled by an associated piston.

BACKGROUND OF THE INVENTION

In order to vary the load pressure prevailing in the outlet port of such a valve, the piston is subjected to an external control force tending to change the effective width of the restricted passage against the countervailing action of a restoring force. The control force may be transmitted mechanically, e.g. by a cam acting through a coil spring, or electromagnetically, as by a solenoid. In the latter case, e.g. as described in German published specifications Nos. 2,225,305 and 2,353,262, the exerted control force will be substantially proportional to the applied input current; the maintenance of a similar proportionality between that current and the resultant load pressure, however, is more difficult to achieve.

OBJECTS OF THE INVENTION

An important object of my present invention, therefore, is to provide a valve of the type described in which the load pressure varies substantially linearly with the control pressure.

Another object is to provide a valve of this description capable of handling a large flow of pressure fluid, with a wide dynamic range, a low hysteresis and high sensitivity.

SUMMARY OF THE INVENTION

In accordance with my present invention, the inlet port of the cylinder housing opens into a peripheral recess of the valve piston, this recess being bounded by two piston heads one of which has an edge defining with the outlet port the aforementioned restricted passage. The piston has an axial bore which communicates with the outlet port and slidably receives a plug, in the shape of a cylindrical plunger or a sphere, backstopped by an abutment rigid with the cylinder housing. The load pressure acts within the axial piston bore as a passage-narrowing force opposing a passage-widening control force applied to the opposite piston head by force-transmitting means such as those referred to above.

In an advantageous embodiment, the axial bore traverses the piston head forming the passage-controlling edge and has a transverse branch opening next to that edge into the outlet port.

In order to allow for a limiting operating condition in which the fluid flow to the load is zero, I prefer to provide the outlet port with a throttled bypass leading to a venting channel which also communicates with the cylinder bore at opposite ends of the piston.

BRIEF DESCRIPTION OF THE DRAWING

The above and other features of the invention will now be described in detail with reference to the accompanying drawing in which.

SPECIFIC DESCRIPTION

Figure 1:
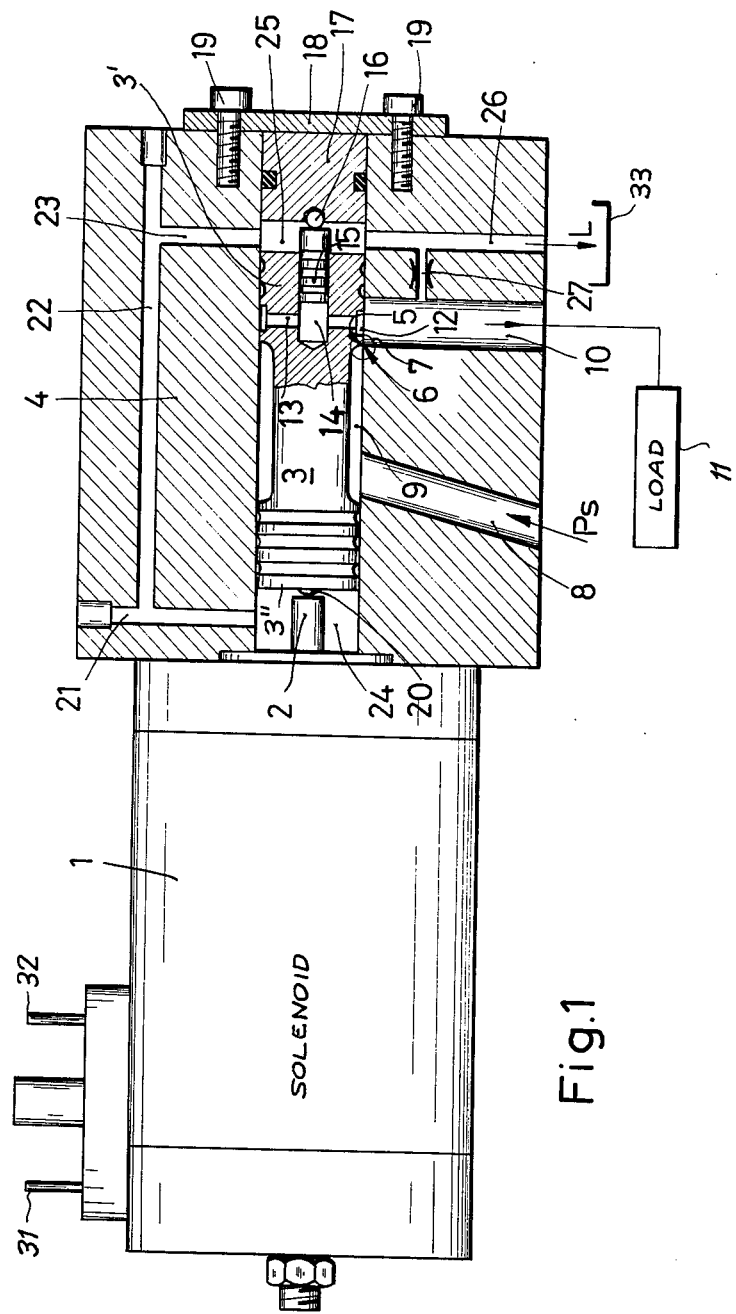
FIG. 1 is an axial sectional view of a pressure-regulating valve embodying my invention.

In FIG. 1 I have shown a solenoid 1 which is energizable via contacts 31, 32 and has an armature 2 acting as a thrust member for axially displacing a valve piston 3 in a cylinder bore 24 of a valve housing 4. Piston 3 has two heads 3' and 3", of like diameter, defining between them an annular peripheral recess 9 of a length exceeding the maximum piston stroke. An edge 6 of piston head 3' defines a restricted passage 7 with an outlet port 10 which leads to a load 11. An inlet port 8 receives a high-pressure fluid, such as oil, from a nonillustrated source as indicated diagrammatically by an arrow Ps.

Piston 3 has an annular groove 12 open toward outlet port 10, this groove communicating via several radial branch passages 13 with an axial piston bore 14 slidably receiving a plunger 15. The latter, projecting into a clearance 25 adjacent piston head 3', bears upon a sphere 16 which forms a convex projection in a stopper 17 lodged in the right-hand end of cylinder bore 24, this stopper being held in place by a closure plate 18 which overlies the bore 24 and is fixedly secured to housing 4 by a pair of screws 19. A similar axial boss 20 of hemispherical configuration, projecting from piston head 3", is in contact with thrust member 2; projections 16 and 20 are designed to avoid canting and to minimize friction in the transmission of axial forces.

Several venting channels 21, 22 and 23 communicate with cylinder bore 24 and, via clearance 25 forming part of that bore, with a drain 26 leading to a low-pressure side of the oil pump or to a sump 33 as indicated by an arrow L. Drain 26 communicates with outlet port 10 via a throttled bypass 27 in housing 4.

Figure 2:
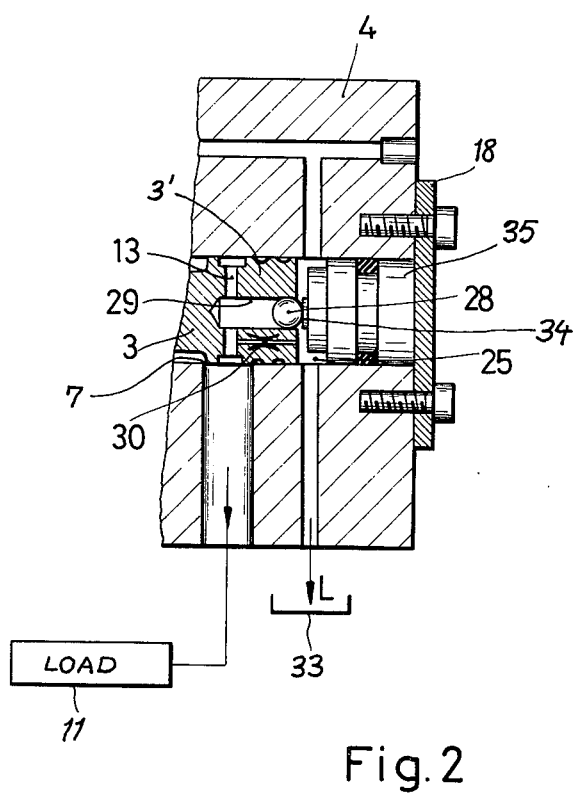
FIG. 2 is a fragmentary sectional view showing a modification of the right-hand end of the valve illustrated in FIG. 1.

As shown in FIG. 2, a similar bypass 30 can be disposed within piston head 3' rather than in the housing.

FIG. 2 further shows a modified piston bore 29 receiving a sphere 28 which is slidable therein and bears upon a flat face of a projection 34 on a stopper 35 held in position by closure plate 18.

In both instances the reaction pressure from the load builds up in piston bore 14 or 29 to counteract the control force applied by thrust member 2 to the opposite end of piston 3, thereby linearizing the ratio of load pressure to supply pressure as the piston automatically adjusts itself to the axial position in which the restricted passage 7 has the proper width for balancing the two forces.

It will be noted that the blind bore 14 or 29 is cut off from recess 9 and thus from inlet port 8 by the edge 6 of piston head 3' whenever the piston 3 moves far enough to the left to close the passage 7; through its branches 13 and groove 12, however, bore 14 or 29 communicates always with outlet port 10 to let the load pressure develop a force opposing the thrust of solenoid armature 2.

I claim:

1. A pressure-regulating valve comprising:
   a housing provided with a cylinder bore;
   a piston axially slidable in said cylinder bore and provided with two axially spaced piston heads defining a peripheral recess between them, said housing having an inlet port opening into said recess between said piston heads and an outlet port leading to a load, said inlet port being connected to a source of high-pressure fluid, one of said piston heads having an edge bounding said recess and defining with said outlet port a restricted passage for said fluid, said one of said piston heads being formed with a blind axial bore opening into said cylinder bore at one end of said piston and communicating with said outlet port via a branch separated from said recess by said edge whereby said axial bore is cut off from said inlet port upon closure of said passage;

adjustable force-transmitting means bearing axially upon the other end of said piston in a direction tending to widen said passage;

venting means connecting portions of said cylinder bore at the ends of said piston to a region of low pressure; and plug means slidably received in said axial bore, said housing being provided in said cylinder bore with abutment means facing said one end of said piston and backstopping said plug means for developing in said axial bore a load pressure bearing axially upon said piston in a direction opposing widening of said passage.

2. A pressure-regulating valve as defined in claim 1 wherein said force-transmitting means comprises an electromagnetically actuated thrust member.

3. A pressure-regulating valve as defined in claim 2 wherein said other of said piston heads is provided with a hemispherical axial boss engaged by said thrust member.

4. A pressure-regulating valve as defined in claim 1 wherein said conduit means communicates with said outlet port through a throttled bypass.

5. A pressure-regulating valve as defined in claim 4 wherein said throttled bypass is disposed in said one of said piston heads alongside said axial bore.

6. A pressure-regulating valve as defined in claim 1 wherein said abutment means comprises an end element of said housing overlying said cylinder bore and a stopper in said cylinder bore resting against said end element.

7. A pressure-regulating valve as defined in claim 6 wherein said stopper has a central projection confronting said axial bore.

8. A pressure-regulating valve as defined in claim 7 wherein said projection has a convex face and said plug means comprises a cylindrical plunger contacting said convex face.

9. A pressure-regulating valve as defined in claim 7 wherein said projection has a flat face and said plug means comprises a sphere contacting said flat face.

* * * * *